United States Patent [19]

Freeman

[11] Patent Number: 5,286,161
[45] Date of Patent: Feb. 15, 1994

[54] METHOD OF PRODUCING SILAGE REMOVAL CHANNEL

[76] Inventor: Edward Freeman, R.R. No. 3, Rockwood, Ontario, Canada, N0B 2K0

[21] Appl. No.: 832,283

[22] Filed: Feb. 7, 1992

[51] Int. Cl.[5] .............................................. B65G 69/00
[52] U.S. Cl. ................................... 414/786; 414/287; 414/288; 414/297; 414/304; 249/65
[58] Field of Search ............... 254/93 HP; 414/287, 414/288, 289, 292, 293, 294, 295, 296, 297, 299, 786, 300, 301, 303, 304, 305, 313, 314, 315, 316, 317, 318, 319, 320, 321, 322; 249/65; 606/192–195; 604/96–103

[56] References Cited

U.S. PATENT DOCUMENTS

| | | | |
|---|---|---|---|
| 1,094,726 | 4/1914 | Latimer | 414/288 |
| 2,863,576 | 12/1958 | Trask, Sr. | 414/297 |
| 3,063,585 | 11/1962 | Bruecker | 414/297 X |
| 3,251,292 | 5/1966 | Vaughan | 414/287 X |
| 3,898,778 | 8/1975 | Erickson et al. | 249/65 X |
| 4,599,029 | 7/1986 | Zyduck | 414/297 |

FOREIGN PATENT DOCUMENTS

| | | | |
|---|---|---|---|
| 73081 | 4/1960 | France | 414/304 |
| 1311328 | 10/1962 | France | 414/297 |
| 140930 | 6/1987 | Japan | 414/304 |

Primary Examiner—Frank E. Werner
Attorney, Agent, or Firm—Jeffrey T. Imai; Arne I. Fors

[57] ABSTRACT

A method of producing a silage removal channel. The method comprises the steps of disposing an inflatable tube within an empty silo, inflating the tube, filling the silo with feedstuff, deflating the tube and then withdrawing the same from the interior of the silo to create the silage removal channel within the feedstuff. The created channel is disposed from the uppermost surface of the feedstuff to a discharge port disposed in the exterior wall of the silo. When required feedstuff is introduced into the mouth of the channel, it gravitates through the channel to the discharge port where it may be removed from the silo.

10 Claims, 3 Drawing Sheets

METHOD OF PRODUCING SILAGE REMOVAL CHANNEL

BACKGROUND OF THE INVENTION

This invention relates generally to a method of producing a silage removal channel and more specifically to a method of producing a silage removal channel within the silage in a silo.

SUMMARY OF THE PRIOR ART

Crops such as corn, grasses, and clover, and grains such as barley, wheat and oats, are stored in silos as whole plant feedstuffs for livestock. As the feed rests in storage it settles and compacts in the structure and a pickling-like process known as ensiling takes place. The feedstuff in the silo is then commonly known as "silage". In order to remove silage from the silo a means of access and egress is provided by the placement of a series of openings continuously from the top to the bottom of the silo. These openings are approximately 20"×24" and are covered with a moveable wooden or steel door. The series of doors are located on the side of the silo where it is desirable to have the feedstuff removed.

When the operator of the silo wishes to remove silage, one of the doors is opened and the silage is pushed through this opening. The silage gravitates towards the ground and is deposited thereon in a fan-like pattern. Vertical tunnel-like shrouds are therefore positioned so that they cover the doors. The shroud or chute prevents the gravitating feedstuff from fanning out and directs it to a specific location at the bottom of the silo.

When silos were first built, the only method of removing the silage was for the operator to climb a ladder disposed within the chute carrying a fork, pick axe and shovel to loosen the compacted silage. The loosened silage was deposited through the door and allowed to gravitate through the chute to the ground. The operator then climbed out a door and down the ladder. As the ladder was now covered with the slippery or dusty silage, the journey down was dangerous for the operator.

Mechanical silo unloaders are now commonly used to loosen the compacted silage and deposit the same through the openings and into the chute. It remains necessary for the operator to climb the slippery ladder in the chute on a routine basis to alter the position of the silo unloader as the level of the silage is lowered. The ensiling of certain feedstuffs creates a fine dust which is hazardous to the health of the operator.

SUMMARY OF THE INVENTION

The present invention comprises a method for producing a silage removal channel or chute within the interior of a silo.

The method comprises the steps of disposing an inflatable tube means within an empty silo, inflating the tube means, filling the silo with feedstuff, deflating the tube means and then withdrawing the same from the interior of the silo to create the silage removal channel.

The tube means is disposed so as to lie substantially parallel to the longitudinal axis of the silo. It is mounted within the empty silo by passing a rope means through a door means disposed in the side of the silo. The rope means is passed into the interior of the silo and then to the exterior of the silo through a discharge port which is disposed proximate the base of the silo. The rope means is attached to a first end of the tube means and when that part of the rope means which enters the silo through the door means is pulled, the tube means is raised within the interior of the silo until it lies substantially parallel to the longitudinal axis of the same.

The tube means is preferably inflated by connecting it to compressed air supply and the silo is filled with feedstuffs in the conventional manner. When the feedstuff has settled to a sufficient degree, the tube means is removed by attaching it to a vacuum and deflating it. When the tube means is deflated to a sufficient degree, the operator pulls the end of the tube means until the tube means has been entirely removed from the interior of the silo through the discharge port which is disposed proximate to the base of the silo. The removal of the tube means creates a channel within the feedstuff and the feedstuff ma be deposited into the mouth of the channel by suitable means.

The internally formed channel allows silage to move through the channel to the bottom of the silo, eliminating the need and cost of an external chute. It provides a safe, clean environment for the operator to climb the structure to any access door if this becomes necessary.

BRIEF DESCRIPTION OF THE DRAWINGS

The preferred embodiment of the invention will now be described with the aid of the following drawings, in which.

DETAILED DESCRIPTION OF THE PREFERRED EMBODIMENT

Figure 1:
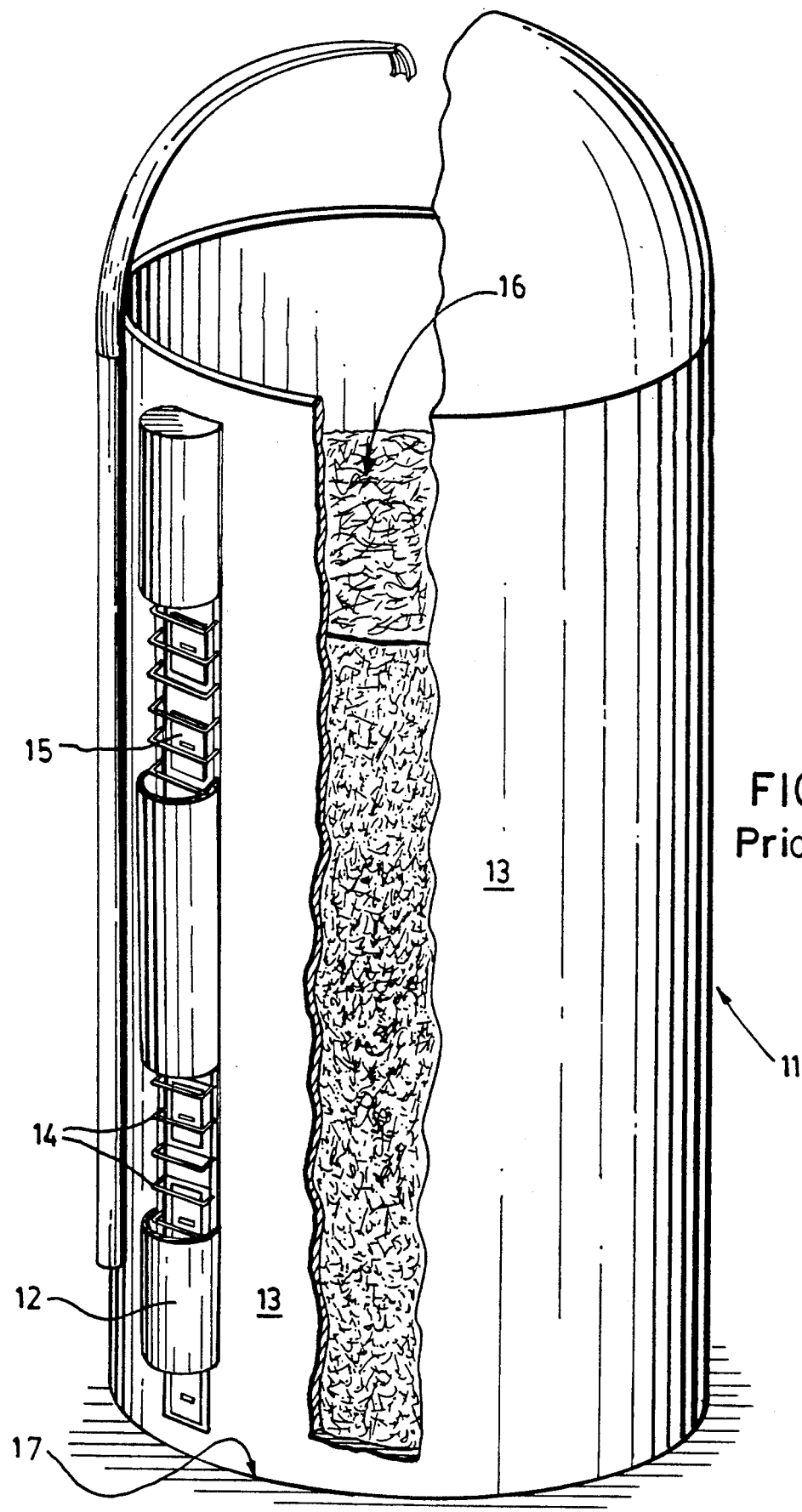
FIG. 1 is a partial cross-section through a silo showing the method of removing silage used in the prior art.

FIG. 1 shows the previously known method of removing silage 10 from a silo 11. A conventional discharge chute 12 is disposed on the exterior wall 13 of the silo. The rungs 14 of a ladder-like structure are disposed within the chute 12 so that the operator is able to reach the doors 15 to access the stored silage 10. The operator would climb up the rungs 14 of the ladder-like structure, open the door 15 which is disposed proximate the uppermost surface 16 of the silage. He would position a mechanical silo-unloader (not shown) to loosen the uppermost surface 16 of the silage and then climb down the rungs 14 to the bottom of the silo. Loosened silage would be moved by the silo-unloader through the door 15 and into the chute 12. The silage would gravitate to the base 17 of the silo where it could be removed to feed livestock. Periodically, the operator would have to climb up the ladder-like structure to alter the position of the silo unloader. This would require the operator to traverse the now slippery rungs 14 in a hazardous dusty chute 12.

Referring to FIGS. 2-7, there is shown a method of creating a silage removal channel within the interior of the silo.

Figure 2:
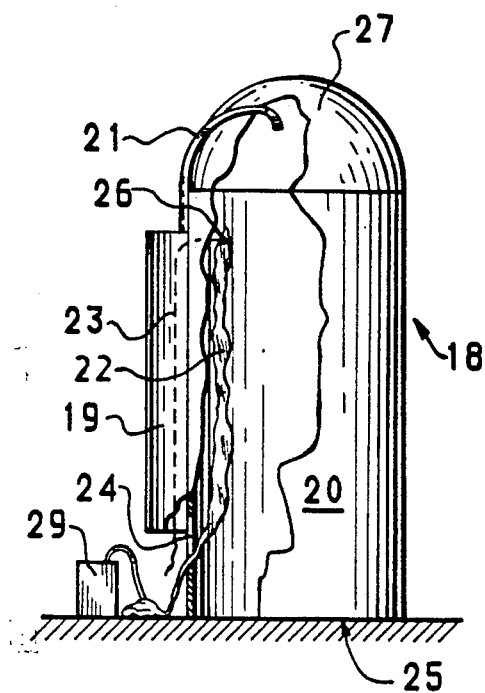
FIG. 2 is a partial cross-section through a silo showing the placement of the tube.
Figure 3:
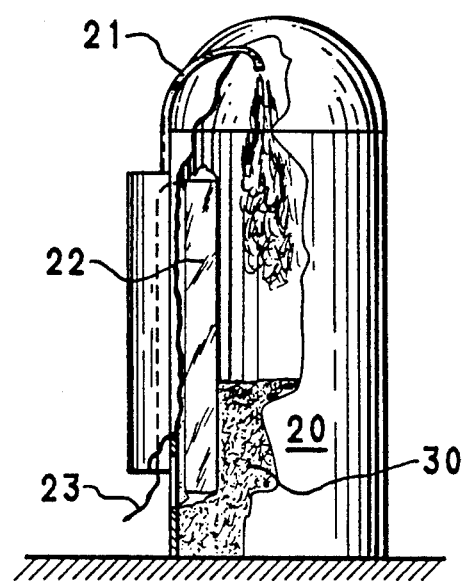
FIGS. 3 and 4 are partial cross-sections through a silo showing the inflation of the tube and the filling of the silo with feedstuffs.
Figure 4:
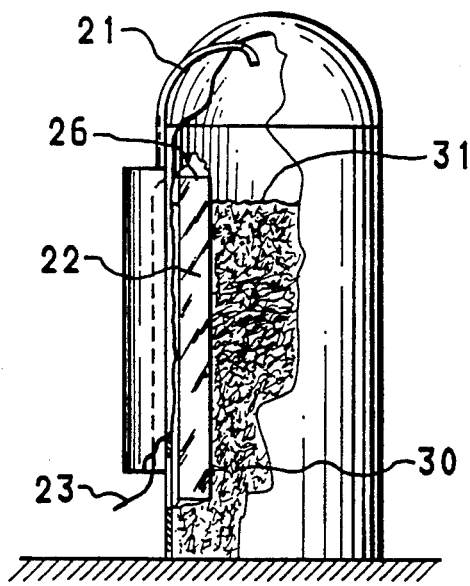
Figure 5:
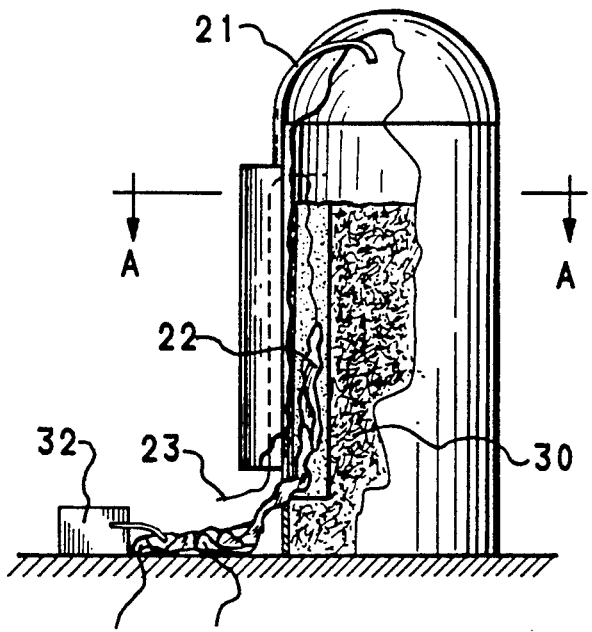
FIG. 5 is a partial cross-section through a silo showing the removal of the tube.

A conventional silo 18 is shown in FIG. 2. The silo 18 may have a conventional chute 19 disposed on its exterior wall 20. A loading pipe 21 is also disposed on the exterior wall 20 to allow feedstuff to be introduced into the silo 18. An inflatable tube 22 is introduced into the interior of the silo when it is empty. A rope 23 is passed through a door (not shown) into the interior of the silo 18 and is drawn through a discharge port 24 near the base 25 of the silo. The rope 23 is tied to a first end 26 of the tube 22 and the operator then pulls on that part of the rope 23 disposed within the chute 19. This action raises the first end 26 of the tube 22 towards the top 27 of the silo wall 18.

The tube 22 used in the present invention is a high tech, strong, flexible, poly-fibre tube. It is manufactured from an ultra violet resistant, flame resistant material; has a two second flame out, and is capable of withstanding temperatures of below $-67°$ F. The tube material is also able to withstand substantial pressure. The tube material has a hydrostatic resistance of 500 psi.

When the tube 22 is positioned to lie substantially parallel to the longitudinal axis of the silo 18, a compressed air supply 29 is attached to a nozzle (not shown) on the tube 22 and the tube is inflated. The silo's discharge port 24 is sealed off by the tube and feedstuff 30 is introduced into the silo 18 through the loading pipe 21. The feedstuff 30 may be allowed to accumulate within the silo until the uppermost surface 31 lies proximate to the top of the silo wall.

The tube 22 is then removed in the following manner. A vacuum 32 is attached to the nozzle (not shown) and is actuated to remove the air from the tube 22. When the tube 22 has been deflated to a sufficient degree, it may be removed from the interior of the silo 18 by pulling the second end 28 of tube 22. Once the tube 22 is removed it can be seen that a channel 33 has been formed within the silage 30.

Figure 6:
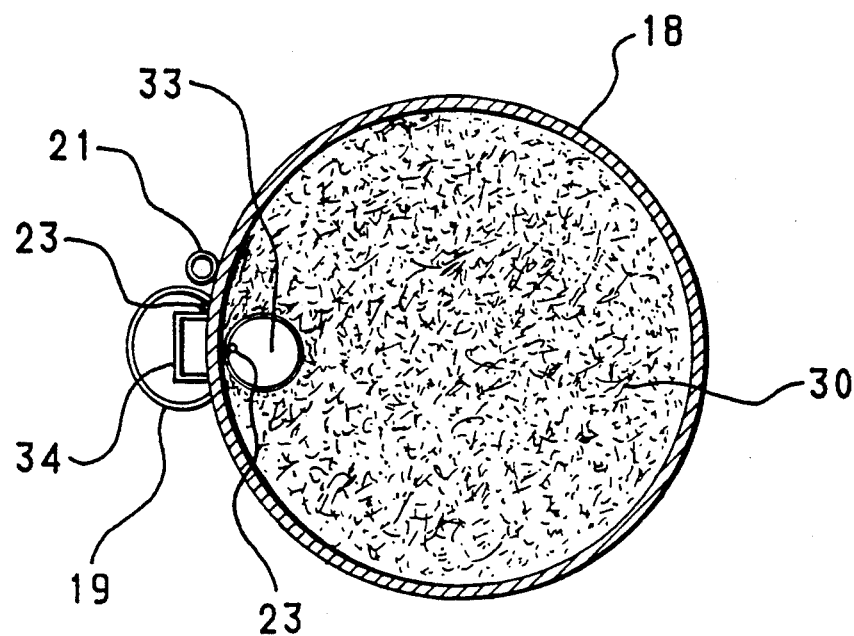
FIG. 6 is a plan view of the silo through line AA' of FIG. 5.
Figure 7:
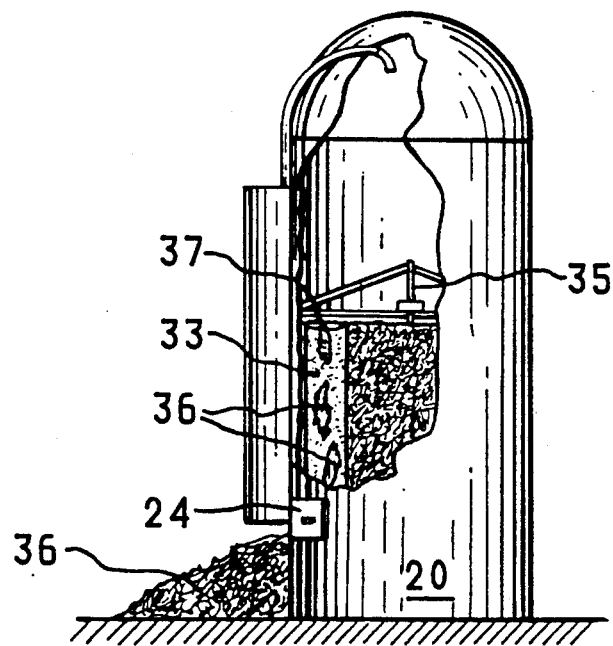
FIG. 7 is a partial cross-section through a silo showing removal of silage through the channel created by the tube.

Referring to FIG. 6, it can be seen that the channel 33 lies within the silage 30. The sides of the channel 33 are smooth. The rope 23 is disposed within the channel 33 and can be easily removed therefrom. The rungs 34 of a ladder can be see disposed within the conventional discharge chute 19.

A mechanical silo unloader 35 (FIG. 7) such as that manufactured by Freeman Farm Systems of Rockwood, Ontario, Canada, is disposed within the silo to loosen the silage 30 and deposit it into the mouth 37 of the channel 33. The loosened silage 36 gravitates through the channel 33, passes through the discharge port 24 and onto the ground.

The tube 22 may be easily rolled up and stored, or it can be re-installed in an empty or partially full silo.

This method of creating a channel within the silage basically eliminates the need and cost of providing an external discharge chute on silos. It also provides a safer, cleaner environment for the operator to climb the structure to access any door if this becomes necessary.

While the invention has been described in conjunction with specific embodiments thereof, it is evident that many alternatives, modifications, and variations will be apparent to those skilled in the art in the light of the foregoing description. Accordingly, it is intended to embrace all such alternatives, modifications and variations, as fall within the spirit and broad scope of the appended claims.

The embodiments of the invention in which an exclusive property or privilege is claimed are defined as follows:

1. A method of producing a silage removal channel in silage stored in a silo, said silo comprising a wall having an interior surface and having a series of doors spaced vertically along the wall for discharging the silage, said method comprising the steps of:
   disposing an inflatable tube within the silo when in an empty state, said tube placed so as to lie on the interior surface of the wall of the silo and to extend from an upper one of the series of doors to a lower one of the series of doors;
   inflating said tube;
   introducing feedstuff into the silo for storage;
   allowing the feedstuff to settle for compacting the feedstuff to silage;
   deflating said tube;
   removing said tube thereby creating a channel in the silage for passing silage from the top thereof to the lower one of said series of doors for discharge from the silo.

2. A method of producing a silage removal channel as defined in claim 1, wherein said tube is disposed within the silo by passing a rope through the upper one of the series of doors and into the interior of the silo and then through the lower one of the series of doors; attaching said rope to a first end of the tube and then pulling the tube means into the silo and up towards the upper one of the series of doors.

3. A method of producing a silage removal channel as defined in claim 1, wherein the tube is inflated by attaching a compressed air supply to the same to introduce air into the tube.

4. A method of producing a silage removal channel as defined in claim 1 wherein the silo has a loading pipe mounted to the exterior of the wall, and feedstuff is introduced into the silo and around the tube through the loading pipe.

5. A method of producing a silage removal channel as defined in claim 1, wherein the tube is deflated by attaching a vacuum to the tube and actuating the same to withdraw air therefrom.

6. A method of producing a silage removal channel as defined in claim 1, wherein the tube comprises a flexible poly-fibre tube which is sealed at both ends and which has an inflation/deflation nozzle disposed at a point intermediate said both ends.

7. A method of producing a silage removal channel as defined in claim 6, wherein the tube is able to withstand temperatures down to $-67°$ F.

8. A method of producing a silage removal channel as defined in claim 6, wherein the tube is manufactured from a fire resistant material.

9. A method of producing a silage removal channel as defined in claim 6, wherein the tube is able to withstand substantial pressure.

10. A method of producing a silage removal channel as defined in claim 6, wherein the tube is manufactured from an ultra violet light resistant material.

* * * * *